United States Patent [19]
Davis

[11] B 3,924,598
[45] Dec. 9, 1975

[54] INTERNAL COMBUSTION ENGINE
[75] Inventor: Charles W. Davis, Simsbury, Conn.
[73] Assignee: Texaco Inc., New York, N.Y.
[22] Filed: Nov. 1, 1972
[21] Appl. No.: 302,692
[44] Published under the Trial Voluntary Protest Program on January 28, 1975 as document no. B 302,692.

[52] U.S. Cl. .............................. 123/32 ST; 123/127
[51] Int. Cl.² ..................... F02B 19/10; F02B 19/16
[58] Field of Search ............ 123/32 R, 32 ST, 32 SP

[56] References Cited
UNITED STATES PATENTS

| | | | |
|---|---|---|---|
| 1,483,619 | 2/1929 | Smith | 123/32 ST |
| 2,184,357 | 12/1939 | Mallory | 123/32 ST |
| 2,484,009 | 10/1949 | Barber | 123/32 ST |
| 2,652,039 | 9/1953 | Weslake | 123/32 ST |
| 2,758,576 | 8/1956 | Schlamann | 123/32 ST |
| 2,767,692 | 10/1956 | Barber | 123/32 ST |
| 2,803,230 | 8/1957 | Bensinger | 123/32 ST |
| 3,094,974 | 6/1963 | Barber | 123/32 ST |
| 3,154,059 | 10/1964 | Witzky | 123/32 ST |
| 3,315,650 | 4/1967 | Bishop | 123/32 ST |
| 3,439,656 | 4/1969 | Hideg | 123/32 ST |
| 3,443,552 | 5/1969 | Von Seggern | 123/32 ST |
| 3,696,798 | 10/1972 | Bishop | 123/32 ST |
| 3,699,929 | 10/1972 | Bennethum | 123/8.09 |
| R25,578 | 5/1964 | Witzky | 123/32 ST |

*Primary Examiner*—Charles J. Myhre
*Assistant Examiner*—Ronald B. Cox
*Attorney, Agent, or Firm*—Thomas H. Whaley; C. G. Ries; Robert B. Burns

[57] ABSTRACT

A method and apparatus for operating a premixed charge, piston type, internal combustion engine with variation of the premixed charge to a leaner fuel-air mixture than is usual, wherein ignition of the main, power producing, premixed fuel-air mixture charge is caused by the flame resulting from spark ignition of a pilot fuel charge which is injected into a swirling mixture adjacent positive ignition means in the engine cylinder.

9 Claims, 7 Drawing Figures

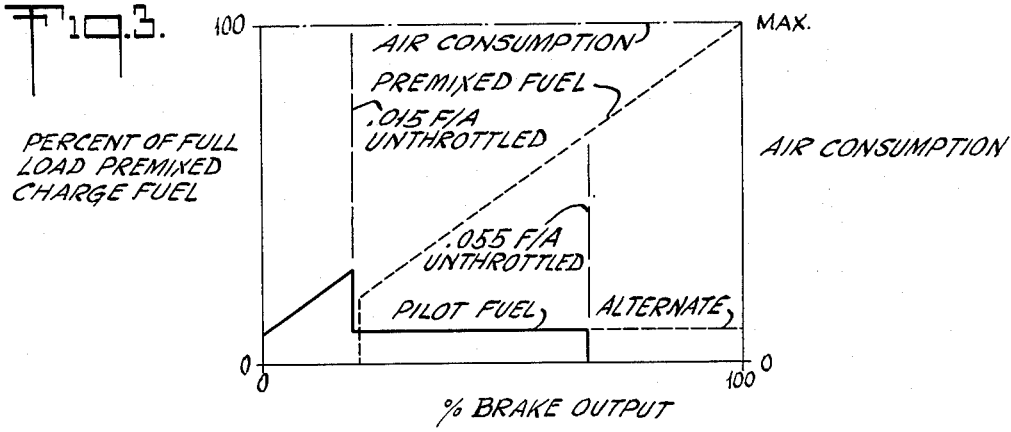
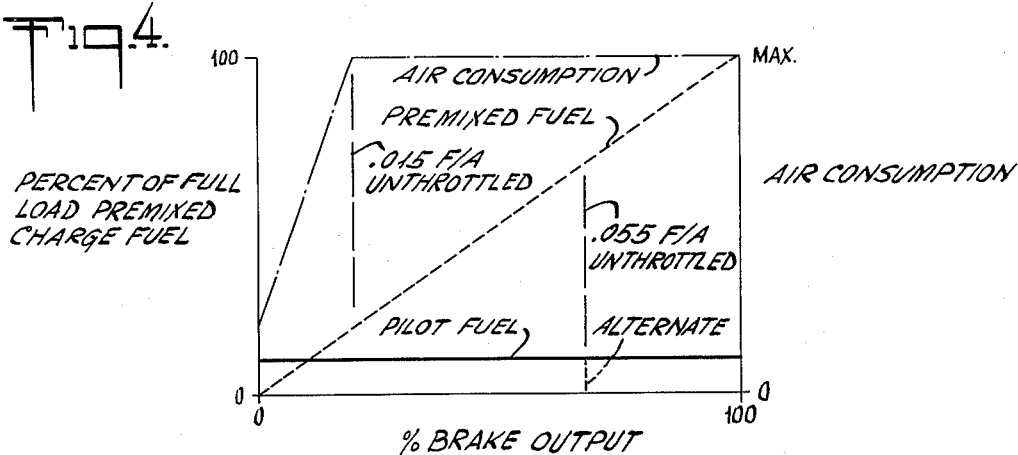
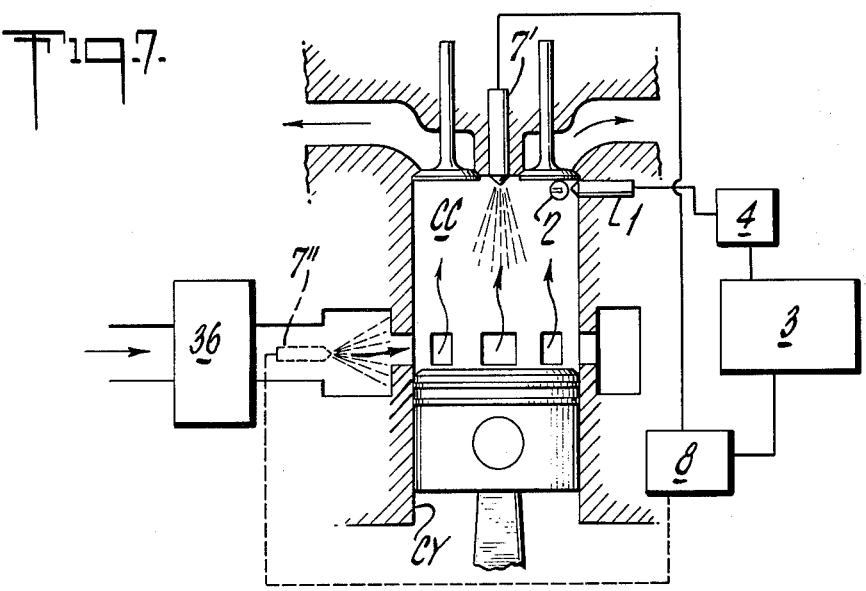

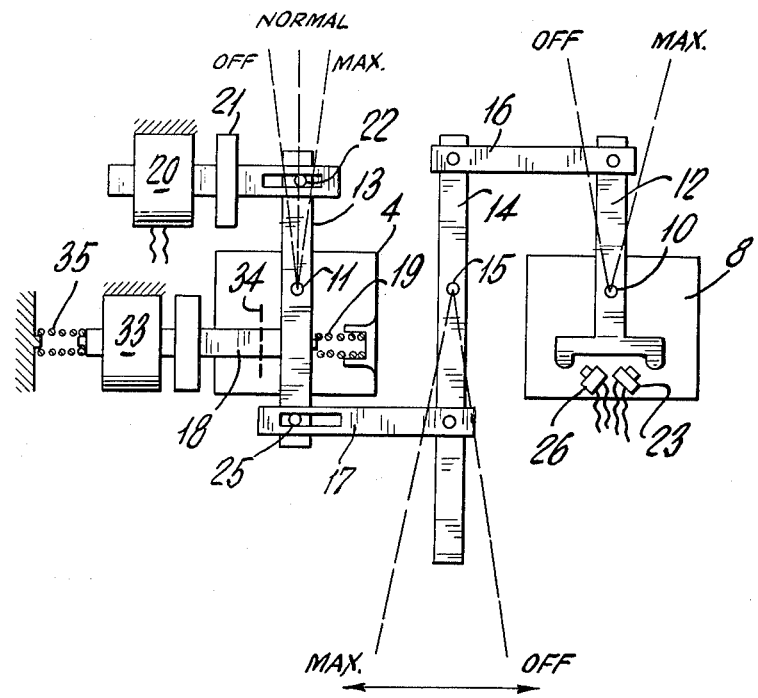
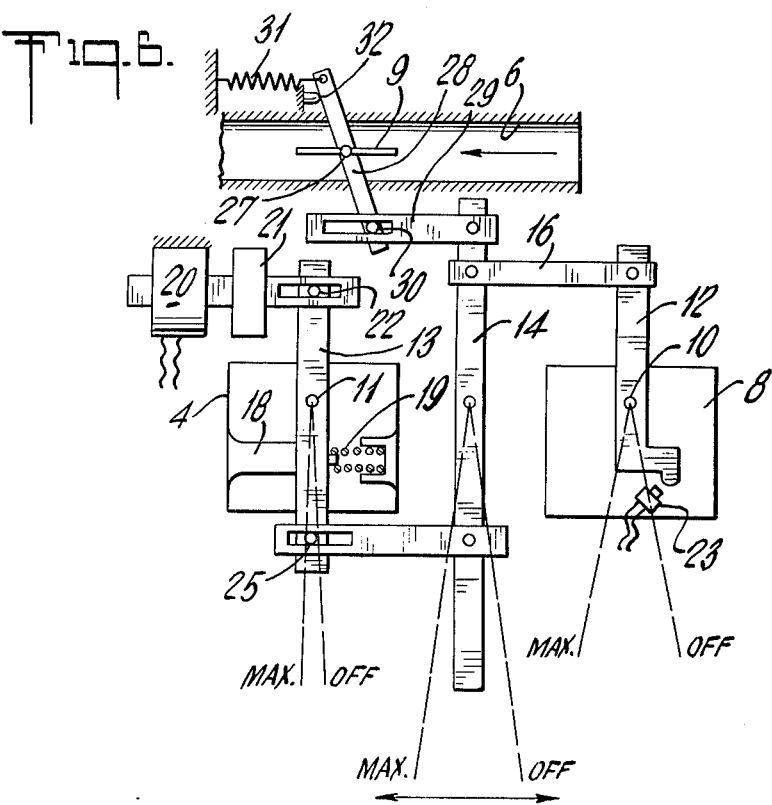

3,924,598

INTERNAL COMBUSTION ENGINE

BACKGROUND OF THE INVENTION

Combustion in current premixed charge engines is effected usually either by direct spark ignition or by the flame resulting from compression ignition of a small pilot fuel charge of high Cetane number, which is injected into the engine cylinder just prior to the start of combustion.

The direct ignition method requires intake throttling for load control becuase the mixture strength must be maintained above the lean limit of spark ignition. This lean limit usually occurs at a fuel to air (F/A) ratio of about 0.055 (weight basis) depending on the engine. In practice, the F/A ratio is maintained generally in the range of from 0.06 to 0.08. If the engine were to run without intake throttling, it would have to function with a F/A ratio of about 0.005 to provide zero brake output or idle operation. The intake throttling required with direct spark igintion causes a severe reduction in the part load fuel economy of the engine.

Operation of a premixed charge, internal combustion engine with a compression ignition pilot flame, usually called a dual fuel engine, eliminates the need for throttling in most instances, because considerably leaner mixtures can be ignited by a flame than by a direct spark. The output of such engines therefore is regulated generally by variation of mixture strength without air throttling, and part load fuel economy is much better than with direct spark ignition engines. However, compression ignition of the pilot charge requires a relatively high compression ratio and a high Cotane number pilot fuel. The high compression ratio is to some degree incompatible with the compression ratio restriction imposed by possible detonation of the main premixed charge depending on its Octane number rating and by anti-pollution requirements. In addition, two distinctly different types of fuel must be available: high Cotane fuel for the pilot charge and high Octane fuel for the premixed charge, and the engine must be rugged to accommodate the necessarily high compression ratio.

The operation of non-throttled premixed charge engines that use variable mixture strength is limited to those mixtures which are sufficiently fuel rich to support flame propagation. Operation below the lean limit of flame propagation is impossible regardless of the method of ignition. For the purposes of this specification, it is known that this lean limit corresponds to a F/A ratio of about b 0.010–0.020, although the actual lean limit may be somewhat leaner or richer depending on the particular engine in question. Engine output using an unthrottled mixture of this strength usually will be greater than the minimum output desired, and special means to provide stable operation with a further reduction of total fuel supplied to the engine must be used for lighter loads.

SUMMARY OF THE INVENTION

This invention relates to an improved method and apparatus for the operation of a premixed charge, piston type, internal combustion engine. It relates particularly to extending the operation of such an engine to very lean fuel to air (F/A) mixtures by variation of the mixture strength of the premixed charge, resulting in low fuel consumption, production of low exhaust emissions and low exhaust gas temperatures. Ignition of such mixtures is caused by the flame of a spark ignitably rich pilot fuel charge.

The pilot fuel charge is injected into a cylinder toward positive ignition means, e.g., a spark plug. The pilot fuel charge then is ignited in the same non-knocking manner as disclosed in U.S. Pat. Nos. 2,484,009, 2,864,347, 2,958,314 and 3,094,974. The resulting pilot fuel charge flame ingites the main, power producing, premixed fuel charge.

With a pilot flame as the means of ignition, fuel-air mixtures as lean as 20 percent to 30 percent of stoichiometric can be ignited and burned. Consequently, engines adapted for ingition with a pilot flame as disclosed herein can be operated at much leaner fuel-air mixtures than with ordinary spark igntition.

BRIEF DESCRIPTION OF THE DRAWINGS

FIGS. 3 and 4 are graphs illustrating fuel supply and air flow schedules with variations of engine output at constant engine speeds;

FIGS. 5 and 6 disclose apparatus for the coordinated control of pilot injection quantity, the premixed charge fuel quantity and the intake air throttling with variation of engine output at very low loads; and FIG. 7 illustrates diagrammatically the application of the invention to a two-stroke cycle, internal combustion engine.

DESCRIPTION OF THE PREFERRED EMBODIMENT

Figure 1:
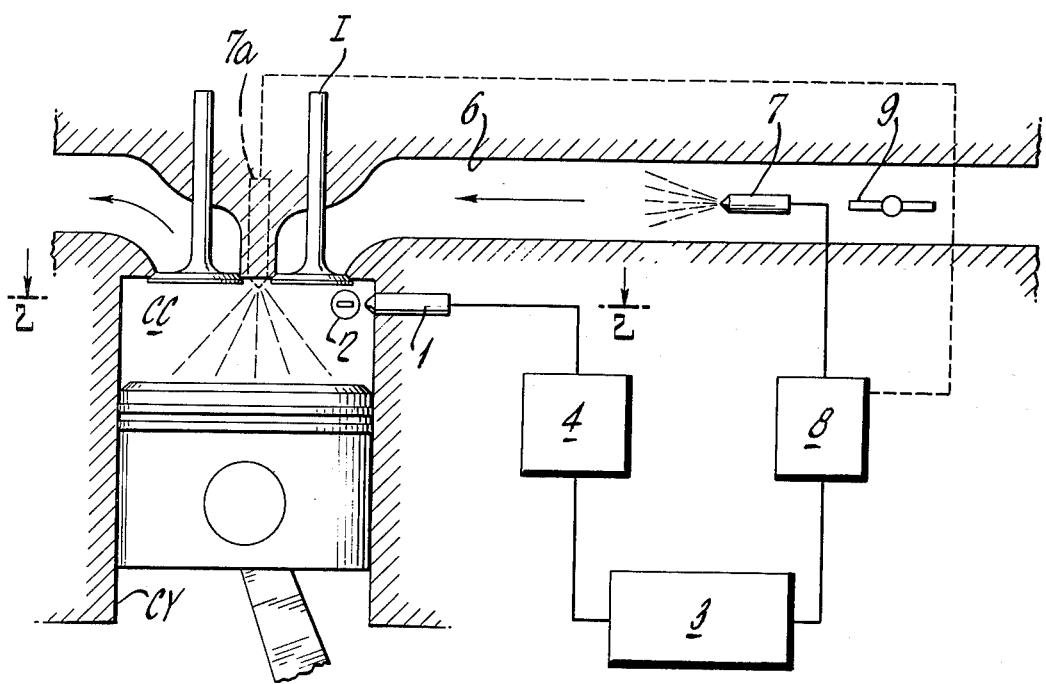
FIG. 1 shows diagrammatically a cylinder of an internal combustion engine, and the basic structural elements for the injection of the pilot fuel charge and for the admission of the premixed fuel/air charge.
Figure 2:
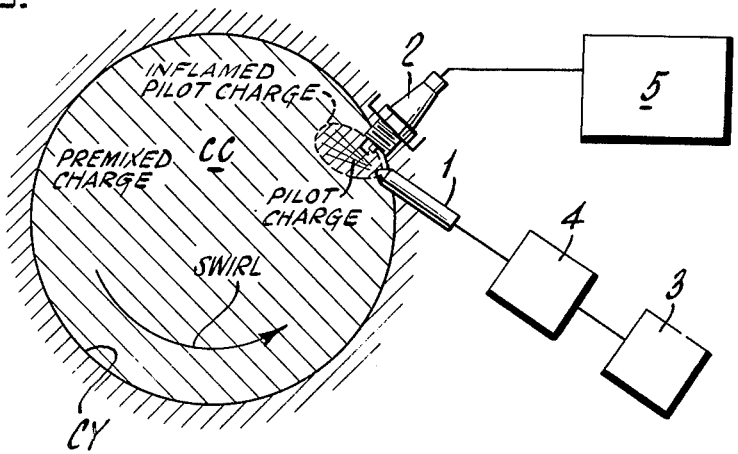
FIG. 2 is a partial cross section taken along line 2—2 of FIG. 1, with an additional showing of the structures for the provision of the pilot and premixed charges.

FIGS. 1 and 2 illustrate a single cylinder, internal combustion engine structure, operating on a four-stroke cycle, disclosing the several features of this invention. A pilot fuel injection nozzle 1 is mounted in the wall of the engine cylinder CY so that fuel can be introduced into the combustion chamber CC of the cylinder at a point immediately adjacent positive ignition means, e.g., spark plug 2. Nozzle 1 is connected to fuel supply source 3 via pilot fuel pump and control means 4, the latter providing intermittent, timed injection of a predeterminted quantitiy of pilot fuel, which may be constant. The timing of this fuel injection, selected as desired, usually ranges from about 0 to 40 crank angle degrees BTC on the compression stroke of the engine cycle.

Spark plug 2 is connected in the normal manner to ignition system 5, the firing of which is coordinated for a spark to occur at the spark plug gap at substantially the same time that pilot fuel injection begins, so that the desired pilot flame is produced. This procedure is described fully in U.S. Pat. No. 2,484,009, issued to E.M. Barber, the disclosure of which is incorporated herein by this reference.

A variable strength premixed charge is supplied to the combustion chamber of the engine cylinder via the intake tube 6 and the intake valve I. Fuel flow is varied in proportion to load from substantially zero to the quantity required to provide an unthrottled premixed charge with a F/A ratio of 0.08. Air flow is unthrottled except as noted later, depending on the desired engine output. Nozzle 7, control 8 and throttle valve 9 comprise one means for producing the desired amount and mixture strength of the premixed charge. The inlet port and valve are disposed so that the incoming premixed charge swirls about the axis of the combustion chamber CC at about 3 times the rate of engine crankshaft rotation. This premixed charge is ignited by the pilot flame.

FIG. 1 also discloses an alternate location for the premixed charge nozzle at 7a, mounted to discharge into the combustion chamber of the cylider. Intermittent timed injection must be used with this location with injection timed to occur early in the intake stroke. The fuel used by the engine can be a liquid or a gas with appropriate variations of pumping and control means 4 and 8, such means being known in the art.

As the engine operates over most of its output range, unthrottled premixed charge is admitted to the cylinder of the engine during the intake period and subsequently is compressed therewithin. At about 20° BTC, for example, on the compression stoke, pilot injection nozzle 1 injects the normal pilot fuel charge, which consists of from 5 to 15 percent of the full load premixed fuel charge, into the combustion chamber where it is ignited by a spark at spark plug 2 in essentially the same manner as in the non-knocking combustion process as disclosed in the above cited U.S. Pat. No. 2,484,009. The flame resulting from combustion of the pilot fuel charge ignites the main premixed charge and the engine develops the required power output.

When the engine output is such that the premixed charge mixture strength exceeds about 0.055 F/A ratio, it may be desirable to terminate pilot injection since the premixed charge now can be spark ignited directly. Continuation of pilot injection may be desirable also in some cases since improved ignition will be assured thereby.

In the event that it becomes necessary to operate the engine at an output below that which corresponds to an unthrottled premixed charge mixture strength which is below the lean limit of flame propagation, i.e., leaner than about 0.015 F/A ratio, operation is conducted in generally the same manner as above except that the fuel and/or air supply schedule is modified in one of the following ways: Premixed charge fuel delivery from nozzle 7 can be terminated and the engine operated entirely on the pilot fuel injection, the amount of the pilot fuel injection being increased suddenly by an amount equal to the premixed charge fuel at its point of termination, and then gradually reduced as engine output is further reduced. Alternately, a fixed amount of pilot fuel injection can be maintained and a further progressive reduction of premixed charge fuel made with a simultaneous reduction of air consumption by intake throttling to maintain the premixed charge F/A ratio alone about 0.015 for flame propagation. FIGS. 3 and 4 illustrate generally the fuel supply and air flow schedules provided with variations of engine output according to the operations described above.

FIGS. 5 and 6 disclose means for obtaining this coordinated control of the pilot injection quantity, the premixed charge fuel quantity and the intake air throttling with variation of engine output. The control shaft 10 of premixed charge fuel control unit 8 is equipped with arm 12 which is attached to the main control lever 14 by pinned link 16. Control lever 14 is pivotally mounted at point 15 and is positioned manually or by a governor (not shown). Pilot charge fuel control unit 4 has control shaft 11 equipped with arm 13 which is attached to control lever 14 by slotted, pinned link 17. Spring 19 tends to hold arm 13 in the normal or maximum pilot fuel position against stop 18. Arm 13 is also connected to solenoid 20 by slotted solenoid armature 21 via pin 22.

In the position of the mechanism shown by FIGS. 5 and 6, the pilot charge is at its normal value and the premixed charge F/A ratio at about 0.04. If the control arm 14 is moved toward the maximum engine output position, link 16 and arm 12 will cause the premixed fuel delivery to be increased. The pilot fuel quantity will remain constant because of slotted link 17 until a premixed charge F/A ratio of about 0.055 is reached (note that the throttle valve 9 is wide open), at which point arm 12 will contact electrical switch 23, energizing solenoid 20 and causing control arm 13 to be pulled to the off position terminating pilot injection. Alternately, switch 23, solenoid 20 and solenoid armature 21 may be omitted so that pilot injection is not terminated when the premixed fuel-air ratio has increased to 0.055. If the mechanism is moved from a position where the premixed charge is richer than 0.055 F/A ratio to one where it is leaner, the reverse situation will occur; arm 12 will trip switch 23, deenergizing solenoid 20, so that spring 19 can push arm 13 to the position where normal pilot injection is restored.

Referring only to FIG. 5, which shows the arrangement for light load control by variation of pilot injection quantity, if control lever 14 is moved toward the off position, the premixed charge fuel flow will be reduced until the unthrottled F/A ratio reaches about 0.015, at which point arm 12 will trip electrical switch 26, energizing a solenoid valve (not shown) in the fuel supply line to nozzle 7 and terminating fuel delivery therefrom. During this motion of control lever 14, the pilot charge fuel will be maintained at its normal value because of the slotted connection between member 13 and 17. However, when arm 12 trips switch 26, solenoid 33 is energized also and the armature thereof, which acts as stop 18, is moved such that the end of member 18 stops arm 13 at a new position shown by line 34 as it is forced in this direction by spring 19. With arm 13 in this new position, additional fuel is supplied in the pilot charge, the increase being equal to the premixed fuel flow at its point of termination. At this point, pin 25 in arm 13 engages the end of the slot in link 17 and further motion of the control lever 14 causes arm 13 to be moved to a position of lesser pilot fuel flow, eventually shutting it off completely. If control lever 14 is now moved toward the maximum output position, the reverse situation will occur: pilot fuel flow will increase until arm 12 trips switch 26, at which point pilot fuel flow will be returned to its normal amount and premixed fuel flow will be restored with a F/A ratio of about 0.015. Spring 35 urges member 18 toward arm 13, spring 35 being stronger than spring 19.

Referring only to FIG. 6, which shows the arrangement for very light load control by intake throttling, throttle valve 9 pivots on shaft 27 in mixing tube 6, with the shaft being equipped with arm 28, which is connected to control lever 14 by slotted link 29. Throttle arm 28 is held against stop 32 in the wide open position by spring 31. If the control lever 14 is moved toward the off position, premixed charge fuel is reduced by the action of members 16 and 12 but pilot fuel flow is maintained at a maximum because of the slot in link 17. When control lever 14 has reached the point where the unthrottled premixed charge F/A ratio has been reduced to about 0.015, pin 30 in arm 28 engages the end of the slot in link 29. Further motion of control lever 14 toward the off position results in a progressive closure of throttle valve 9 and a further reduction of the premixed charge fuel flow, maintaining the premixed F/A ratio above about 0.015 and therefore capable of sustaining flame propagation. When throttle valve 9 has been substantially closed and the premixed fuel flow is substantially zero, pin 25 in arm 13 engages the end of the slot in link 17 and a slight further movement of control lever 14 to the off position causes pilot fuel to be reduced abruptly from its normal value to zero. Note that in all cases, the normal quantity of pilot fuel supplied is that which is required by the engine to operate at zero brake output.

Thus far, the disclosure has been directed generally to a four-stroke cycle, internal combustion engine with the fuel for the premixed charge introduced into the air in the intake tube (manifold) external the engine cylinder. Application of the invention to cylinder injection of the fuel which will form the premixed charge is illustrated alternatively in FIG. 1 also, substituting the dashed line and the nozzle 7a for the nozzle 7 and the solid line leading from control 8 to it. Nozzle 7a must have intermittent injection timed to occur on the early part of the compression stroke, and is to follow a fuel quantity program similar to that illustrated by FIG. 3 and discussed in detail in connection with nozzle 7.

FIG. 7 shows a schematic diagram of a two-stroke cycle, piston ported intake, poppet exhaust, uniflow engine cylinder having angled intake ports to produce swirl. The cylinder is equipped with conventional engine driven and/or exhaust driven air blower means generally designated as 36. Other components of the engine have the same numerical designations and serve the same purposes as previously described with respect to FIGS. 1 and 2.

Nozzle 7', of the 2-cycle drawing, FIG. 7, injects fuel for the premixed charge which is ignited by the inflamed pilot charge, and must have intermittent injection timed to start near the exhaust and intake closings and to terminate before the beginning of the pilot injection. The nozzle 7' is to follow a fuel quantity program similar to that illustrated by FIG. 3 and, of course, based on the air trapped in the cylinder.

Alternatively, nozzle 7'', FIG. 7, injects fuel for the premixed charge which is ignited by the inflamed pilot charge. Nozzle 7'' may have continuous fuel flow following a pattern similar to that illustrated by FIGS. 3 or 4 based on the air supplied to the cylinder. This alternate position nozzle is in an undesirable location since part of the mixture which it forms will pass directly through the engine cylinder.

The subject disclosure may be applied also to rotary combustion chamber, internal combustion engines which have a substantially triangular rotating piston revolving in an epitrochoidal chamber of generally rectangular shape to drive a crankshaft (not shown).

Other modifications and variations of the invention as hereinbefore set forth may be made without departing from the spirit and scope thereof, and therefore, only such limitations should be imposed as are indicated in the appended claims.

I claim:

1. An apparatus for the coordinated control of the operation of an internal combustion engine with a leaner usual fuel-air mixture, i.e., a fuel to air (F/A) ratio less than 0.055 (weight basis), by variation of the mixture strength with maximum air consumption comprising a first control means comprising a pilot charge fuel control unit and including injection means for providing an intermittent timed injection of a predetermined quantity of a pilot fuel charge into the combustion chamber of a cylinder of said engine and positive ignition means, e.g. a spark plug, in said combustion chamber adjacent said injection means, intake means for providing a variable premixed fuel-air mixture leading into, said combustion chamber a second control means comprising a premixed charge fuel control unit and including a nozzle positioned in said intake means for providing fuel thereinto, a first pivoted triple linkage comprising an arm, a pinned link and a control lever in operative association with said second control means and electrical switch means actuated thereby, a second triple linkage comprising an arm and a pair of slotted links pinned thereto in operative association with said first control means, one of said pair of slotted links being joined pivotally to said control lever of said first triple linkage, said pair of slotted links responding to the positioning of said control lever of said first triple linkage, one of said pair of slotted links of said second triple linkage being responsive to said electrical switch means.

2. In an apparatus as defined in claim 1, a linkage comprising a slotted link pivotally joined to said control lever of said first pivoted linkage and an arm pivoted to said throttle valve for controlling intake air with variation of engine output at very low loads by actuation of said control lever.

3. In an apparatus as defined in claim 1, the pilot fuel charge control means providing for a constant quantity for a predetermined time.

4. In a apparatus as defined in claim 1, said pilot fuel charge control means providing sufficient fuel to form a fuel-air mixture capable of ignition by said positive means.

5. In an apparatus as defined in claim 1, said second control means providing a fuel to air mixture for flame ignition thereof.

6. In an apparatus as defined in claim 5, said second control means providing a fuel to air mixture ratio in the range from about 0.015 to about 0.080.

7. In an apparatus as defined in claim 3, said second control means providing a constant quantity of pilot fuel, said first control means controlling air consumption including a throttle valve for very low load operation below a fuel to air ratio of 0.015.

8. In an apparatus as defined in claim 3, said pilot fuel charge providing said constant quantity until 0.055 F/A of unthrottled premixed fuel is reached.

9. In an apparatus as defined in claim 7, said second control means continuously providing pilot fuel throughout the engine load range.

* * * * *